United States Patent Office 3,166,546
Patented Jan. 19, 1965

3,166,546
VAPOR PHASE PROCESS FOR THE POLYM-
ERIZATION OF ISOBUTYLENE
John T. Nolan, Jr., Wappingers Falls, and Harry Chafetz, Poughkeepsie, N.Y., assignors to Texaco Inc., New York, N.Y., a corporation of Delaware
No Drawing. Filed June 9, 1961, Ser. No. 115,919
7 Claims. (Cl. 260—94.3)

This invention relates to the polymerization of isobutylene. More particularly, it relates to the production of isobutylene polymers which have a preponderance of molecules having a particular termination. Still more specifically, this invention relates to a vapor phase method for producing isobutylene polymers terminating with an external double bond.

It is known to polymerize isobutylene using Friedel-Crafts type catalysts such as aluminum halides, ferric halides, zinc halides, boron halides, tin halides, mercuric halides, titanium halides and the like. Ordinarily the reaction is carried out in the presence of a solvent or diluent which is a low molecular weight hydrocarbon, for example, propane, butane, isobutane, pentane, isopentane, or an alkyl halide such as methyl chloride, ethyl chloride, chloroform and the like. Carbon disulfide is also a satisfactory solvent. Apparently, the most commonly used combination is aluminum chloride or boron fluoride as the catalyst and a low molecular weight hydrocarbon as the solvent.

When boron fluoride or other Friedel-Crafts catalyst is used as a catalyst, a small amount of water, alcohol, carboxylic acid, mineral acid or ether is advantageously present as it serves to activate the catalyst.

The polymerization reaction may be carried out as either a batch or a continuous process. It is customary for the isobutylene and the solvent to be introduced into the reactor at a desired temperature followed by the introduction of the catalyst into the reactor. Advantageously, the reaction vessel is equipped with a cooling means to maintain the exothermic reaction at the desired temperature which may range from —110 or lower to 150° F. Pressures in the reactor may vary from atmospheric to 500 p.s.i.g. The catalyst concentration may range from 0.01 to 10% by weight of the feed, about 0.05 to 3% being preferred, with the lower ratio of catalyst to feed producing the higher molecular weight products. In a continuous process, the catalyst is conveniently added to the reactor as a slurry or solution in a solvent and the isobutylene added alone or dissolved in a solvent.

It is generally accepted that isobutylene polymerization using a Friedel-Crafts type catalyst proceeds by cationic mechanism and not by an anionic or free radical mechanism. It has also been established that for the polymerization to take place there must be present a cocatalyst, which forms a complex with a nominal catalyst, and that this complex is the true catalyst. The function of the catalyst is to donate a proton or carbonium ion to the monomer creating a carbonium ion which adds to a further monomer in a chain reaction. The reaction using boron fluoride as a catalyst may be exemplified as follows:

Complex formation:

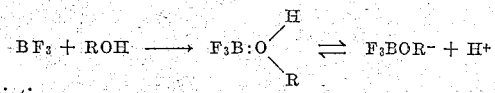

Initiation:

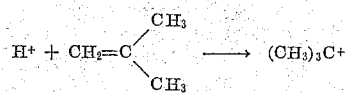

Propagation:

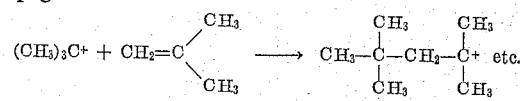

Termination:

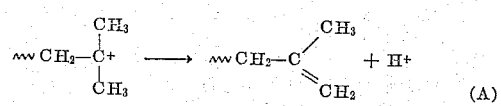

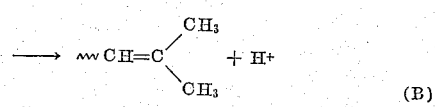

It should be realized that these carbonium ions and protons cannot exist as independent entities in the customary polymerization solvents and therefore the above representations are merely convenient methods of picturing the reactions. However, it will be noted that the chain terminates in a molecule which may have an external double bond as represented in A and which is referred to herein as the 1,1-disubstituted ethylene type or an internal double bond as represented in B and referred to herein as the trisubstituted ethylene type.

There is a significant difference in the properties of the two types of polymer products. Trisubstituted polymer products, which have a sterically hindered internal double bond, are relatively unreactive for certain types of reactions, thereby limiting their usefulness. On the other hand, the 1,1-disubstituted type polymer having an external double bond is chemically more suitable for certain reactions. This property is important where the polymer product is further reacted to produce valuable complex products, such as lube oil additives and the like.

More recently, it has been discovered that the normal distribution of 1,1-disubstituted and trisubstituted polymer types in the polymer product may be altered to produce polymers of essentially the 1,1-disubstituted type by effecting polymerization in a reaction medium comprising liquid sulfur dioxide. This process is the subject of our copending application Serial No. 854,599, filed November 23, 1959, now Patent Number 3,024,226. While effective, this process requires very large quantities of liquid sulfur dioxide as the directive solvent which adversely affects the economics of the process. Further disadvantages are that extensive recovery and purifying steps are required for both the sulfur dioxide and the product.

An improved method for polymerizing isobutylene to produce reactive isobutylene polymers of the 1,1-disubstituted type has now been discovered. The results of this process are particularly surprising and unexpected in that an effective reaction of the type referred to above is realized without employing any liquid solvent or diluent in the polymerization step. A unique feature of this process is that there is no solvent to recover, purify and recycle as is ordinarily required with the result that substantial economies are realized. Another advantage is that a high quality polymer is produced requiring only a minimum amount of finishing steps for recovery of the ultimate product.

In accordance with this invention isobutylene is polymerized in the vapor phase in the presence of or in admixture with a gaseous reaction medium comprising boron trifluoride and sulfur dioxide, the molar proportion of sulfur dioxide to boron trifluoride being in the range of 1:1 to 20:1, at a temperature from about —10° to 50° C. to produce polyisobutylenes having a molecular weight in the range of 250 to 1500 and consisting essentially of the 1,1-disubstituted type. The reaction is initiated by mixing gaseous isobutylene with the reaction medium under the noted temperature conditions.

A feed consisting of at least 80 to 90% of isobutylene is required for this process, the balance, if any, being an inert diluent. Such a feed stream may be obtained by separating isobutylene from an olefin mixture followed by the conventional steps to remove catalyst poisons and other impurities which interfere with the polymerization reaction. A preferable feed stream is essentially pure isobutylene which may be obtained by cracking pure diisobutylene.

This reaction is conducted in the presence of a gaseous mixture of boron trifluoride and sulfur dioxide. Boron trifluoride is a Friedel-Crafts catalyst that is gaseous under atmospheric conditions and has heretofore been employed by dissolving it in a liquid reaction mixture. However, in the present instance, boron trifluoride is effective when introduced in the vapor phase.

For the production of polyisobutylenes having essentially a 1,1-disubstituted type ending, it is important that the instant reaction be conducted in the presence of sulfur dioxide. The sulfur dioxide is introduced in the gaseous state either separately or in admixture with gaseous boron trifluoride. The sulfur dioxide controls or directs the polymerization reaction so that substantially all of the polyisobutylene polymer formed is of the 1,1-disubstituted type having an external double bond in contrast to the trisubstituted polymer type. In the gaseous state, sulfur dioxide is not a solvent in contrast to the liquid sulfur dioxide solvent disclosed in the process of the above-noted copending application. For this reason, it was surprising and unexpected for the vapor phase process to produce essentially 1,1-disubstituted type isbutylene polymers.

To be effective, it is essential that the gaseous reaction medium consist of certain proportions of boron trifluoride and of sulfur dioxide. The critical proportions of sulfur dioxide to boron trifluoride are in the range of 1:1 up to about 20:1, the preferred proportions being from 3:1 to 10:1. A specific preferred ratio of the sulfur dioxide to boron trifluoride is 5:1.

The reaction vessel should be essentially filled with the gaseous reaction medium. In relation to the volume in the reaction zone, there should be from about 0.1 to 10 grams of boron trifluoride per liter of reactor volume. As the reaction progresses and some of the catalyst loses its effectiveness, more of the reaction medium is added to bring the boron trifluoride concentration within the above amounts.

This reaction is also critical with respect to the polymerization temperature. Generally, a temperature of 40° C. or less must be employed, an effective broad temperature range being from about —10 to 50° C., with the preferred temperature range being from 0 to 40° C.

The isobutylene feed should be kept in contact with the reaction medium consisting of boron trifluoride and sulfur dioxide for sufficient time to effect the polymerization reaction. Generally, a period from about 3 seconds to 10 minutes is adequate to effect the desired reaction.

This reaction is generally conducted at atmospheric pressure although a low pressure ranging from atmospheric up to about 500 p.s.i.g. (pounds per square inch gauge) may be employed. It is essential, however, that the pressure be such that the individual components would be in the vapor phase and that the pressure employed does not liquefy the boron trifluoride-sulfur dioxide reaction medium.

Under the above described conditions, essentially complete polymerization of the isobutylene monomer is effected to the desired 1,1-disubstituted polymer type. The polymer products condense as liquid on the walls of the reaction vessel. These products have molecular weights in the range of 250 to about 1500 molecular weight, the higher molecular weight polymers being obtained at the lower polymerization temperatures. The liquid polymer products are continuously withdrawn from the reactor at a rate that is consistent with the maintenance of vapor phase reaction conditions within the reactor. In other words the product is not permitted to build up to a point that the reactor volume is substantially reduced or that excessive pressure is produced in the reactor causing liquefaction of the reaction medium.

The following procedure is employed for conducting the process of this invention. A closed reaction vessel, preferably a vessel having a glass lining is selected. This vessel is charged with gaseous boron trifluoride. Sulfur dioxide vapor is then passed into the reaction vessel until the molar proportion of sulfur dioxide to boron trifluoride is within the broad range of 1:1 to 20:1, preferably a 5:1 molar proportion that has been found most effective. The reactor and its contents are brought to a temperature below 50° C., preferably below 40° C. and to atmospheric pressure prior to the introduction of the isobutylene monomer.

Gaseous isobutylene monomer is slowly introduced into the gaseous reaction medium while the temperature of the reactor and its contents are maintained within the limits set forth above. Any convenient rate of addition can be employed so long as it does not cause the exothermic heat of reaction to upset the temperature limitations in the reactor. As the polymerization progresses, a liquid polymer product condenses on the walls of the reactor and gradually collects and forms a pool in the lowermost section thereof. The product is continuously removed as noted above. The reaction can be continued as long as formation of the polymer is observed in the reactor.

A continuous reaction is facilitated by providing the reactor with a tap or outlet at a low point in the reactor for drawing off the polymer product. Isobutylene monomer is continuously passed into the reactor at a rate which permits polymerization under the hereinabove described conditions. A fresh or supplementary reaction medium charge as required consisting of sulfur dioxide and boron trifluoride can be passed into the reactor either in admixture with the isobutylene feed or through a separate inlet. The polyisobutylene polymer is continuously removed from the reactor.

The following example illustrates the practice of this invention.

*Example*

A glass-lined vessel equipped with a thermometer was filled with boron trifluoride vapor. No sulfur dioxide was employed in this run. Isobutylene was added at such a rate that the temperature of the reactor and its contents remained at 40° C. (or in the range of 36 to 44° C.) at atmospheric pressure while a total of 100 grams of isobutylene was added. Liquid polymer collected on the vessel walls and gradually formed a pool in the reactor.

100 grams of polymer product were recovered from the foregoing reaction. This product was washed, dried and analyzed. 46 wt. percent of the product boiled in the range from 54 to 138° C. at 10 mm. of mercury pressure absolute with the remainder being higher boiling residue. Analysis by infrared spectra showed that both the volatile product and residue consisted of 61% of 1,1-disubstituted polyisobutylene.

The foregoing reaction was repeated in the same reactor under similar conditions with the exception that the reaction medium in this case consisted of sulfur dioxide and boron trifluoride in the molar proportions respectively of 5:1. 100 grams of isobutylene monomer were reacted and 99 grams of polyisobutylene product were recovered. Analysis of the polyisobutylene product distillation cuts obtained showed that the percentage of 1,1-disubstituted polyisobutylene type polymer ranged from 86 to 95%, establishing that polymers of essentially the 1,1-disubstituted type are produced by a vapor phase reaction under selected conditions including at least a 1:1 mol ratio of sulfur dioxide to boron trifluoride.

Obviously, many modifications and variations of the invention, as hereinbefore set forth, may be made without departing from the spirit and scope thereof, and therefore only such limitations should be imposed as are indicated in the appended claims.

We claim:

1. A method for preparing polyisobutylene which comprises providing a reaction zone containing a gaseous reaction medium consisting of boron trifluoride and sulfur dioxide, the molar proportion of said sulfur dioxide being equal to or greater than that of said boron trifluoride, feeding gaseous isobutylene into said reaction zone while maintaining the vapor phase in said zone and effecting polymerization at a temperature below 50° C.

2. A method for preparing polyisobutylene which comprises providing a reaction zone containing a catalytically effective gaseous reaction medium consisting of boron trifluoride and sulfur dioxide, the molar proportion of said sulfur dioxide being equal to or greater than that of said boron trifluoride, feeding gaseous isobutylene into said reaction zone while maintaining the vapor phase in said zone and effecting polymerization at a temperature in the range of −10 to 50° C.

3. A method for preparing polyisobutylene which comprises providing a reaction zone containing a catalytically effective gaseous reaction medium consisting of boron trifluoride and sulfur dioxide, the molar proportion of said sulfur dioxide to said boron trifluoride being in the range of 1:1 to 20:1, feeding gaseous isobutylene into said reaction zone while maintaining the vapor phase in said zone and effecting polymerization at a temperature in the range of −10 to 50° C.

4. A method for preparing polyisobutylene which comprises providing a reaction zone containing a catalytically effective gaseous reaction medium consisting of boron trifluoride and sulfur dioxide, the molar proportion of said sulfur dioxide to said boron trifluoride being in the range of 3:1 to 10:1, feeding gaseous isobutylene into said reaction zone while maintaining the vapor phase in said zone and effecting polymerization at a temperature in the range of −10 to 50° C.

5. A method according to claim 4 in which said polymerization is conducted at a temperature in the range of 0 to 30° C.

6. A method according to claim 4 in which the molar proportion of said sulfur dioxide to said boron trifluoride is about 5:1.

7. A method for preparing polyisobutylene having an average molecular weight in the range of 250 to 1500 and in which at least 85% of the polymer product is characterized by a terminal double bond, which comprises providing a reaction zone containing a catalytically effective gaseous reaction medium consisting of boron trifluoride and sulfur dioxide, the molar proportion of said sulfur dioxide to said boron trifluoride being in the range of 1:1 to 20:1, feeding gaseous isobutylene into said reaction zone while maintaining the vapor phase in said zone and effecting polymerization at a temperature in the range of −10 to 50° C.

References Cited in the file of this patent
UNITED STATES PATENTS

| | | |
|---|---|---|
| 2,536,841 | Dornte et al. | Jan. 2, 1951 |
| 2,552,508 | Peters | May 15, 1951 |